Feb. 16, 1965   W. W. HARRIS   3,169,763
APPARATUS TO TRANSFER PLIABLE MATERIAL
Filed Feb. 23, 1962   4 Sheets-Sheet 4
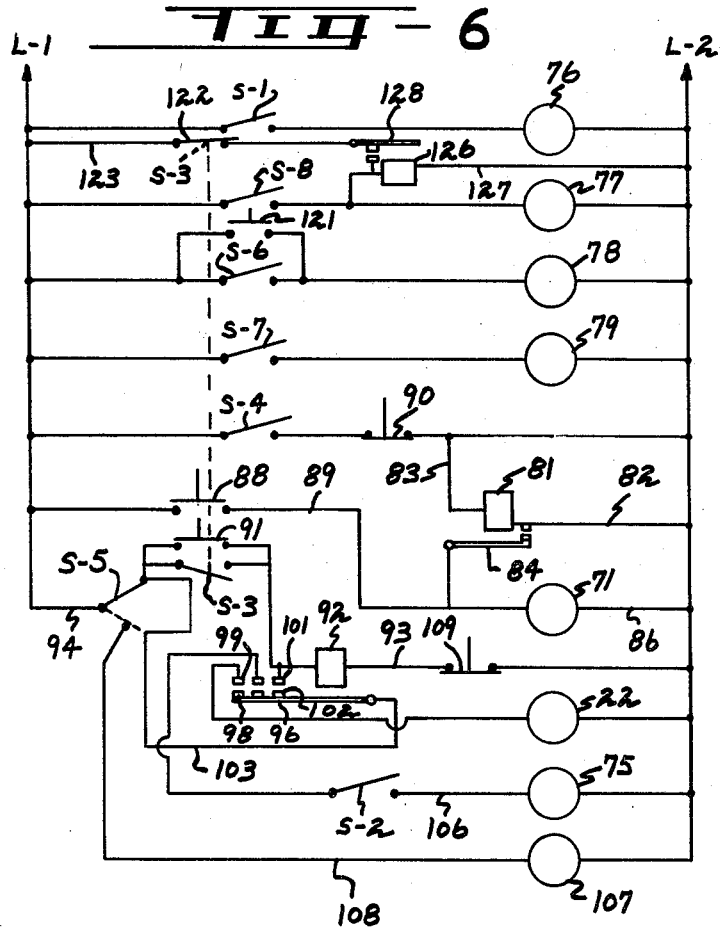
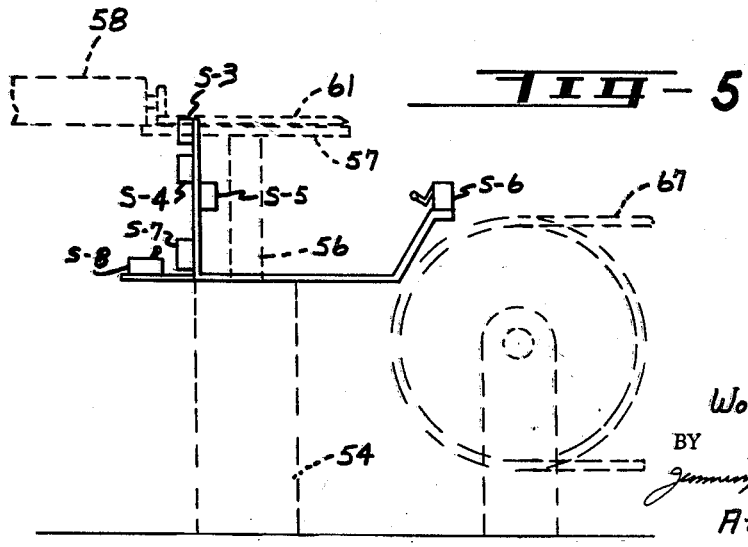
INVENTOR.
Woodrow W. Harris
BY
Jennings Carter & Thompson
Attorneys United States Patent Office 3,169,763
Patented Feb. 16, 1965

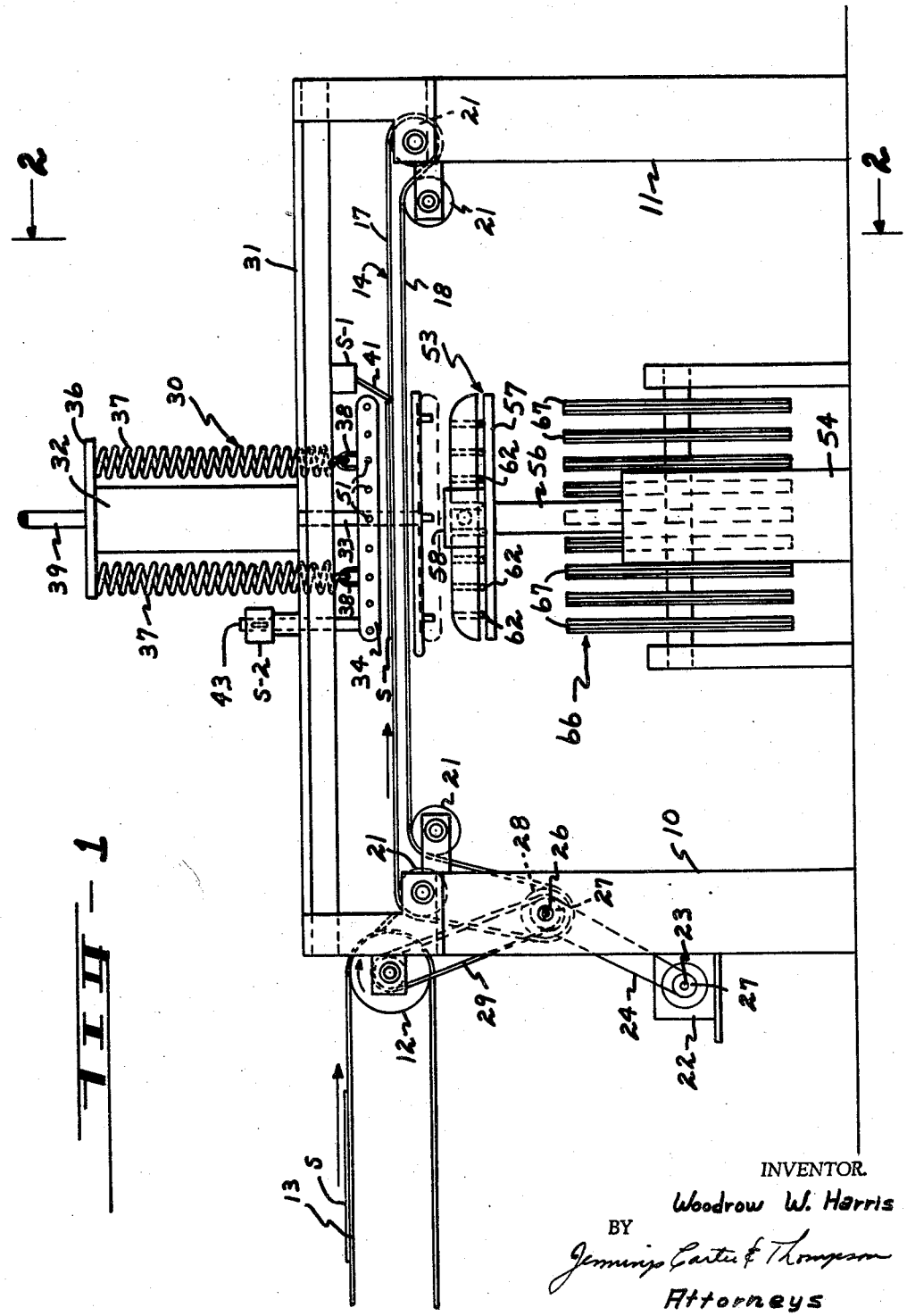

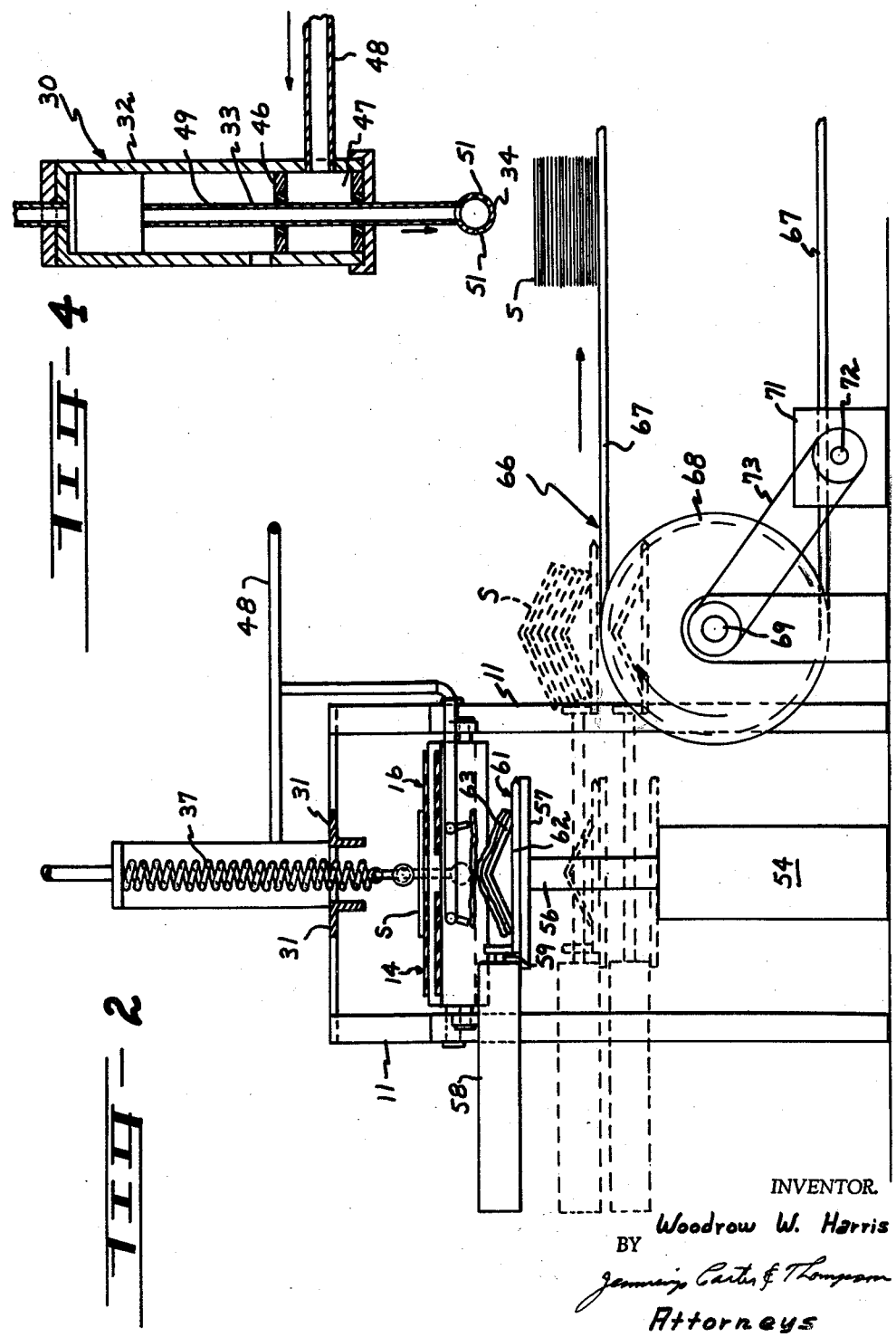

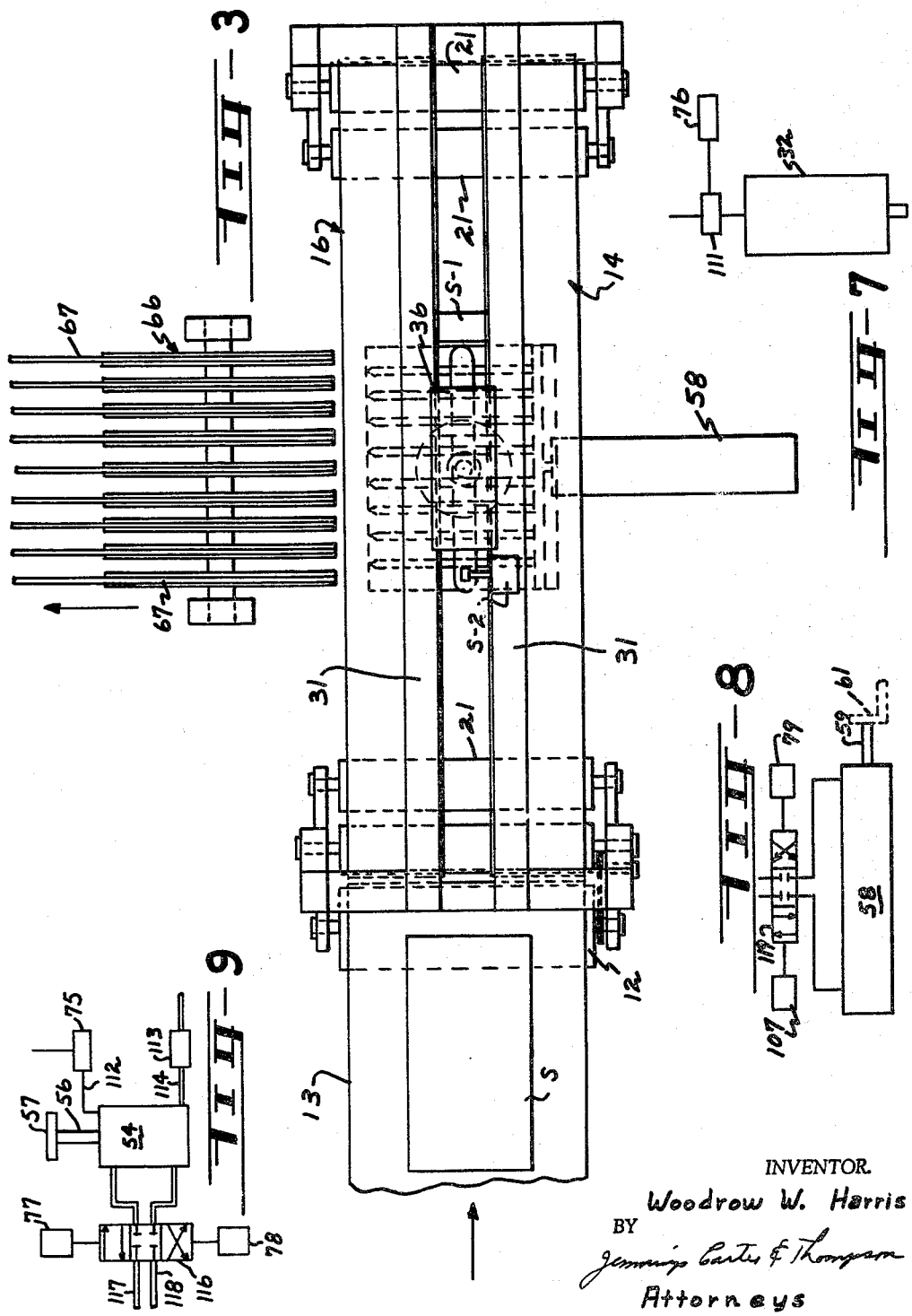

3,169,763
APPARATUS TO TRANSFER PLIABLE MATERIAL
Woodrow W. Harris, Alexander City, Ala., assignor to The Russell Manufacturing Company, a corporation of Alabama
Filed Feb. 23, 1962, Ser. No. 175,150
3 Claims. (Cl. 271—68)

This invention relates to an apparatus and process to transfer sheets of pliable material and more particularly to such an apparatus and process to transfer such sheets from conveying means to support means beneath the conveying means.

Heretofore, it has been difficult to take individual pieces or sheets of pliable material on which work has been performed and form the sheets in a stack so that the stack may be moved to other locations or stations for further work. In textile operations where individual pieces of pliable fabric materials have been sewn, it is necessary that the sewn material be collected and sent to other locations where additional work will be performed on the sewn pieces such as assembly of the sewn pieces into a garment. In many instances heretofore the individually sewn piecss of fabric have been collected in a stack by hand and then moved manually to other areas of the textile plant for subsequent work operations.

It is an object of the present invention to provide an apparatus and process to transfer sheets of pliable material by a pair of generally parallel, spaced, side-by-side conveyors with individual pliable sheets supported for movement by the conveyors and spanning the space between the conveyors, and means to push the pliable sheets through the space between the conveyors onto support means beneath the conveyors.

A further object of my invention is to provide a process of stacking a plurality of sheets of pliable material comprising conveying the sheets over a station at which they are to be stacked by supporting opposite edges of the sheets while leaving an unsupported intermediate portion, exerting pressure on the unsupported portion to push the sheets downwardly, and blowing gas on the sheets as they are placed on the stack thereby to smooth the sheets.

A further object is to provide an unloading mechanism for a stack of material which comprises a horizontally movable tray having a plurality of fingers which support the stack and which move between a plurality of spaced endless conveyors thereby to deliver the stack onto the endless conveyors.

An additional object of my invention is to provide apparatus to stack sheets of pliable material having a pair of spaced, generally parallel conveyors, an air cylinder having a piston rod movable in the space between the conveyors, and a tubular pusher member carried by the end of the piston rod to push the sheets downwardly between the conveyors to the stack and having air ports therein that emit air when a pliable sheet is being placed on the stack thereby to smooth the sheet.

Apparatus for carrying out my process to transfer sheets of pliable material from one location to another is shown and disclosed in the accompanying drawings, forming a part of this application, in which:

FIG. 1 is a side elevational view of apparatus embodying the present invention adapted to stack pliable sheets of material;

FIG. 2 is a taken generally along line 2—2 of FIG. 1 and shows a pair of generally parallel endless conveyors spaced from each other and supporting sheets of pliable material thereon;

FIG. 3 is a top plan view of the apparatus shown in FIGS. 1 and 2 showing the spaced conveyors on which the sheets of pliable material are fed and showing stack conveying means extending perpendicularly thereto to remove a stack formed from the separate sheets;

FIG. 4 is an enlarged longitudinal section view of an air cylinder and a pusher member on the end of a piston rod for pushing the pliable sheets between the spaced conveyors;

FIG. 5 is a schematic view of the arrangement of the several switches engaged through the movement of the stack support means;

FIG. 6 is a schematic view of the electrical system for the apparatus shown in FIGS. 1–5;

FIG. 7 is a schematic view of control means to actuate the pusher member;

FIG. 8 is a schematic view of the means to control the horizontal movement of a tray on which a stack is supported; and, FIG. 9 is a schematic view of the means to control the vertical movement of the stack support means.

Referring now to the drawings for a better understanding of my invention, I show in FIGS. 1–3 vertical supports 10 and 11. A roller 12 is mounted on vertical support 10 and a discharge conveyor 13 is trained about roller 12. Discharge conveyor 13 receives sheets or pieces of pliable material, such as fabric material, from other operations, such as sewing, and delivers the individual sheets of material onto the upper surface of a pair of generally parallel horizontally spaced conveyors 14 and 16 arranged in side-by-side relation. As shown in FIG. 2, a sheet S of material spans the space between conveyors 14 and 16 and is supported adjacent opposite sides by conveyors 14 and 16. The upper run of conveyors 14 and 16 is indicated by the numeral 17 while the lower run thereof is indicated by the numeral 18. Rolls 21 are mounted on supports 10 and 11 and endless conveyors 14 and 16 extend therearound.

Drive means for conveyors 13, 14 and 16 comprises a motor 22 having a drive shaft 23 thereon. A V-belt 24 drives countershaft 26 through pulleys 27. A roll 28 is mounted on shaft 26 and belts 14 and 16 extend therearound and are driven thereby. Pulley 27 has a second V-belt 29 thereon which drives roll 12 and thereby conveyor 13. Thus, upon energizing motor 22, conveyor 13 and conveyors 14 and 16 are driven thereby. When motor 22 is deenergized, conveyors 13, 14 and 16 stop.

*Pusher mechanism*

Horizontal supports 31 extend between vertical supports 10 and 11 and a pusher mechanism indicated generally by the numeral 30 is mounted thereon. Pusher mechanism 30 comprises a single acting air cylinder 32 secured to supports 31 and having a downwardly movable tubular piston rod 33. A pusher member 34 is secured to the outer end of piston rod 33 and moves therewith. A support plate 36 on an end of cylinder 33 anchors springs 37 that are connected at 38 to pusher bar 34 and urge pusher bar 34 upwardly. Air is supplied to cylinder 33 through air conduit 39 connected to a suitable air supply (not shown). Upon actuation of cylinder 33, pusher bar 34 moves downwardly and springs 37 pull pusher member 34 upwardly after its downward stroke. A micro switch S–1 has a feeler arm 41 thereon and upon a sheet of material S engaging arm 41, switch S–1 is actuated thereby to actuater air cylinder 33. A switch S–2 is mounted on horizontal supports 31 and rod 43 is secured to pusher member 34 and moves therewith. Switch S–2 closes upon pusher member 34 reaching the end of its lower stroke which will actuate means to lower the stack one sheet at a time as will be explained in detail hereinbelow.

As shown in FIG. 4 cylinder 32 has an air seal 46 therein to form an air chamber 47 supplied with air by air conduit 48 connected to a suitable air supply (not shown). Tubular piston rod 33 has a slot 49 therein and upon pusher member 34 reaching the end of its stroke, slot 49 enters air chamber 47. A suitable opening is provided in cylinder 32 to release air upon downward movement of rod 33. Pusher member 34 has a plurality of air ports 51 therein which are arranged at an angle of about 10 degrees to the horizontal and thus, when slot 49 enters chamber 47, air is emitted through air ports 51 to smooth the sheet S of pliable material being pushed between conveyors 14 and 16 as will be explained more fully below.

Stack support means

Mounted beneath conveyors 14 and 16 is a stack support means indicated generally by the numeral 53. Stack support means 53 comprises fluid cylinder 54 and piston rod 56 extending upwardly therefrom. A support table 57 is secured to the upper end of piston rod 56 for movement therewith and an air cylinder 58 is secured to table 57 for movement therewith. Piston rod 59 extends from cylinder 58 and has a tray 61 secured thereto for movement. Tray 61 comprises a plurality of spaced fingers 62 each of which has an inverted V-shaped member 63 thereon to crease the center of a stack of pliable material. Tray 61 is movable horizontally relative to support table 57 through actuation of air cylinder 58 but is movable vertically with support table 57. Sheets S of pliable material are pushed downwardly between endless conveyors 14 and 16 by pusher member 34 onto tray 61.

Stack conveying means

Means to convey the stack of pliable material from the stack support means 61 is indicated generally by the numeral 66 and comprises a plurality of spaced endless V-belts 67 (see FIGS. 1 and 2) which are arranged in relation to fingers 62 of tray 61 so that fingers 62 will fit between V-belts 67. V-belts 67 are mounted on a plurality of pulleys 68 driven through shaft 69. A motor 71 having a drive shaft 72 drives shaft 69 through belt 73 and suitable pulleys on shafts 69 and 72. Tray 61 is adapted when loaded with a stack to move over the plurality of V-belts 67 and to deliver the stack of pliable material thereon.

Referring now to FIG. 6 in which the electrical circuit is shown diagrammatically, power is supplied through power lines L-1 and L-2. Switch S-1 when closed energizes solenoid 76 which actuates air valve 111 (see FIG. 7) thereby actuating air cylinder 32 to lower pusher member 34. Switch S-2 is closed by movement of pusher member 34 downwardly upon each actuation thereof and energizes solenoid valve 75 (see FIG. 9) which releases a predetermined amount of air through air conduit 112 into the upper end of fluid cylinder 54. A fluid relief valve 113 is connected to the lower end of fluid cylinder 54 through conduit 114 and upon air pressure being emitted at the upper end of cylinder 54 relief valve 113 is actuated to remove a predetermined amount of fluid from cylinder 54 thereby to allow support table 57 and tray 61 to move downwardly a thickness of one sheet of pliable material. Relief valve 113 may be adjusted for different thicknesses of material.

Referring now to FIG. 5, the several switches actuated by the movement of support plate 57 and tray 61 are shown and are actuated in the numerical order shown in FIG. 5 except for switch S-3. Thus, closing of switch S-4 energizes motor 71 to move stack conveyor 66. Upon switch S-5 being actuated, conveyors 13, 14 and 16 stop and tray 61 moves outwardly until it engages switch S-6; then tray 61 moves downwardly with fingers 62 thereof fitting between the spaced belts 67 and delivering the stack of material thereon. Then switch S-7 is engaged to retract tray 61 onto support table 57 and switch S-8 is engaged to raise support table 57 to its original position through actuation of cylinder 54. Closing of switch S-3 energizes motor 22.

Referring to FIG. 9, a three-way valve is indicated by the numeral 116. Fluid is supplied through line 117 and is removed by line 118. Upon energizing of solenoid 78, valve 116 moves downwardly and fluid is supplied to the upper end of cylinder 54 to lower piston rod 56. Upon solenoid 77 being energized, valve 116 moves upwardly and fluid is supplied to the lower end of cylinder 54 thereby to raise table 57.

Referring to FIG. 8, air cylinder 58 is shown and a three-way valve 119 is provided to control air cylinder 58. When solenoid 79 is energized, air is supplied to cylinder 58 to retract piston 59. When solenoid 107 is energized, air is supplied to cylinder 58 to move piston rod 59 and tray 61 outwardly.

Referring to FIG. 6 in which the electrical diagram is shown diagrammatically, switch S-6 actuates solenoid 78 thereby to lower piston rod 56 and tray 61 secured thereto. If desired to lower plate 57 without closing switch S-6, a push button switch 121 is provided. Switch S-7 when closed energizes solenoid 79 which retracts air cylinder 58 from the dotted line position shown in FIG. 2 to its original position on support plate 57. Switch S-4 when closed energizes a relay through lines 82, 83. The relay consists of coil 81 and an arm 84 biased to open position. The closing of the contacts of coil 81 and arm 84 thereof energize the motor 71 through line 86 thereby to start stack conveying means 66. A foot switch 88 is provided in line 89 to energize motor 71 without closing of switch S-4 in the event it is desired to actuate conveying means 66 manually. A manual switch 90 is also provided to deenergize motor 71 even when switch S-4 is closed.

A master control push button switch is indicated by numeral 91 and when switch 91 is closed, a relay coil 92 is energized through lines 93, push button 91, switch S-5 and line 94. Energizing of coil 92 actuates a relay arm 96 normally biased to open position thereby to close all of the contacts on arm 96. Closing of contacts 98 and 99 energizes motor 22 thereby to drive conveyor 13 and spaced conveyors 14 and 16. A holding circuit to hold coil 92 energized is formed through contacts 101, 102, line 103, switch S-5 in line 94 to power line L-1. Solenoid valve 75 in line 106 is energized when switch S-2 is closed upon each downward stroke of pusher member 34 thereby to supply air to cylinder 54 to force fluid through relief valve 113. This arrangement lowers support plate 57 the thickness of a single layer of material which maintains the top of the stack at a constant height. Solenoid 107 in line 108 is energized when switch S-5 is moved to dotted line position. A stop button 109 is provided to deenergize coil 92 manually, if desired, thereby to stop the movement of conveyor 13 and conveyors 14 and 16.

Switch S-3 is a gang switch and has a normally closed arm 122 in line 123. Coil 126 is provided in line 127 and arm 128 thereof is actuated through the energizing of coil 126. Thus, when switch S-8 is closed, coil 126 is energized to close the contacts on arm 128. Thus, when switch S-8 is opened solenoid 77 remains energized until the upper portion of switch S-3 is opened.

Operation

In operation, master push button switch 91 is closed momentarily to energize coil 92 and motor 22. Starting with tray 61 and support plate 57 in the uppermost position thereof, motor 22 is energized to drive conveyors 13, 14 and 16, and individual separate sheets of material are fed by conveyor 13 downwardly onto the spaced pair of conveyors 14 and 16 with the sheets spanning the space between conveyors 14 and 16. Feeler arm 41 of switch S-1 is engaged by a sheet of material, solenoid 76 is energized to actuate air valve 111 and cylinder 32 thereby to move pusher member 34 downwardly in the space between conveyors 14 and 16. On the downward stroke of pusher member 34 and piston rod 32, slot 49 in tubular piston rod 33 is positioned in air chamber 47 and air is emitted through air ports 51 to smooth the sheet of material as it is released on tray 61. Switch S–2 is closed through movement of rod 43 and solenoid air valve 75 is actuated to release air to the upper portion of cylinder 54 thereby forcing fluid through relief valve 113. Support plate 57 and tray 61 are lowered the thickness of a sheet of pliable material. The above sequence is repeated until the predetermined stack of pliable material has been placed on tray 61. Switch S–4 is closed to energize motor 71 thereby to actuate stack conveying means 66 while sheets S are being added to the stack. Sheets of material S are placed on the stack until switch S–5 is actuated and moves to the dotted line position as shown in FIG. 6. When switch S–5 moves to dotted line position, coil 92 is deenergized thereby to open the contacts on arm 96. Motor 22 is thereby deenergized to stop the movement of conveyors 13, 14 and 16. Further, even though switch S–2 is closed, solenoid 75 could not be energized as its contacts on arm 96 are open. Actuation of switch arm S–5 to dotted line position energizes solenoid 107 thereby to actuate air valve 119 and air cylinder 58 and move tray 61 and piston 59 outwardly. Upon engagement of tray 61 with switch S–6, solenoid 78 is energized and cylinder 54 is lowered through actuation of valve 116 (see FIG. 9). Tray 61 which is secured to support table or plate 57 is likewise lowered. On lowering of tray 61, fingers 62 thereof fit between belts 67 and the stack is thereby delivered to belts 67. Upon actuation of switch S–7, solenoid 79 is energized thereby to actuate valve 119 and retract piston rod 59 and tray 61 to its original position on table 57. Actuation of switch S–8 energizes solenoid 77 to actuate valve 116 thereby to raise piston rod 56 and support table 57.

On the upward movement of table 57, switch S–5 is moved to solid line position but coil 92 remains deenergized and the contacts on arm 96 remain open. Further movement of table 57 opens switch S–4 thereby to deenergize coil 81 and motor 71. Thus, stack conveying means 66 is stopped. Upon table 57 reaching its uppermost position, double switch S–3 is actuated with the lower portion thereof being closed and the upper portion thereof being opened. The closing of lower portion of switch S–3 energizes coil 92 to close the contacts on arm 96 and energize motor 22 thereby to drive conveyors 13, 14 and 16. The opening of the upper portion of switch S–3 deenergizes coil 126 thereby to deenergize solenoid 77 allowing valve 116 to return to a neutral position as shown in FIG. 9. Thus, the upward movement of table 57 is stopped. Upon the movement of conveyors 13, 14 and 16, the separate sheets of material engage feeler arm 41 to close switch S–1 and thereby begin a new cycle. Downward movement of table 57 opens the lower portion of switch S–3 and closes the upper portion 122 of switch S–3. Coil 92 remains energized through arm 96, line 103 and switch S–5.

Conveyors 14 and 16 run at a faster surface speed than conveyor 13 as it is desired to space the sheets of material on conveyors 14 and 16 to allow time for pushing the sheets therebetween. For sheets of material around 12 inches in length, a surface speed of 115 feet per minute for conveyor 13 and of 250 feet per minute for the surface speed of conveyors 14 and 16 has been found to work effectively. The speed would vary depending on the length of the material. In a single eight-hour work day, my apparatus has been found to have a capacity of 1,200 dozen separate pieces of pliable material which were properly stacked and then removed in stacks. The pieces of material were approximately 12 inches in length and 10 inches in width. Pusher member 34 may be placed about 1 inch above conveyors 14 and 16 and has a 4 inch stroke. Air ports in pusher member 34 of approximately 3/32 of an inch have been found to work effectively with the ports slanted downwardly at about a 10 degree angle to the horizontal thereby to blow the sides of the pliable material outwardly. A spacing of conveyors 14 and 16 of around 1½ inches has worked satisfactorily.

From the foregoing, it will be understood that I have provided an apparatus and process to transfer pliable material from one location to another by supporting the pliable material on a pair of spaced, generally parallel conveyors and pushing the sheets downwardly through the space between the conveyors. A stack of pliable material is formed beneath the conveyors on a movable tray and the stack is unloaded by moving the tray which has a plurality of fingers thereon between a plurality of endless conveyors thereby to deliver the stack onto the conveyors when the fingers move downwardly between the endless conveyors. The pusher mechanism has a plurality of air ports therein which emit air to smooth the pliable material after it has been pushed between the conveyors and while it is being added to the stack.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. In apparatus to stack sheets of pliable material,
  (a) a pair of generally parallel, spaced, side-by-side conveyors sufficiently close to each other for the material to span the space between the conveyors and to be supported for movement thereby,
  (b) an air cylinder having a tubular piston rod with its outer end movable between the spaced conveyors,
  (c) a tubular pusher member carried by the outer end of the tubular piston rod, said tubular pusher member having air ports therein in fluid communication with the tubular piston rod,
  (d) means to supply air to the pusher member through the tubular piston rod during the downward stroke of the piston, said pusher member moving downwardly in the space between the conveyors upon actuation of the air cylinder and pushing sheets of material downwardly between the conveyors,
  (e) and support means beneath the conveyors to receive the sheets of material as they are delivered to the stack,
  (f) said pusher member emitting air through the air ports when each sheet of material is deposited on the stack thereby to smooth the sheet.
2. In apparatus to stack pliable sheets of material,
  (a) a pair of generally parallel, spaced, side-by-side conveyors sufficiently close to each other for the material to span the space between the conveyors and to be supported by the conveyors,
  (b) fluid pressure means mounted over the space between the conveyors and comprising a gas cylinder having a piston rod movable between the spaced conveyors,
  (c) a pusher member on the lower end of the piston rod having gas ports therein,
  (d) means associated with the pusher member to deliver gas through the gas ports onto the sheets as the sheets are placed on the stack thereby to smooth the sheets,
  (e) and means beneath the conveyors to support a stack of said sheets,
  (f) said pusher member moving downwardly in the space between the conveyors to push the sheets thereon onto a stack on the support means.
3. In apparatus to stack sheets of pliable material,
  (a) a pair of spaced, side-by-side conveyors sufficiently close to each other for the material to span the space between the conveyors and to be supported for movement thereby,

(b) fluid pressure means above the conveyors and comprising a gas cylinder with a downwardly movable piston rod, (c) a pusher member on the lower end of the piston rod having gas ports therein, (d) means associated with the pusher member to deliver gas through the gas ports on the downward stroke of the piston rod, (e) control means for the fluid pressure means actuated by the moving sheets of material on the conveyors thereby to move said piston rod downwardly, (f) means beneath the conveyors to support a stack of said sheets thereon, (g) said pusher member moving downwardly in the space between the conveyors upon actuation of the control means to push sheets of material on the conveyors onto a stack on the support means and emitting gas to smooth the sheets being deposited on the stack, (h) and control means operatively connected to the support means to lower the support means upon each sheet of material being deposited thereby to maintain the top of the stack at substantially constant height.

References Cited by the Examiner
UNITED STATES PATENTS

| | | | |
|---|---|---|---|
| 457,187 | 8/91 | Eckerson | 271—68 |
| 478,347 | 7/92 | Meisel | 271—68 |
| 2,191,881 | 2/40 | Erikson | 271—88 |
| 2,205,767 | 6/40 | Lamb | 271—88 |
| 2,492,024 | 12/49 | McWilliams | 271—68 |
| 2,793,857 | 5/57 | Rauschenberger | 271—88 |
| 2,849,236 | 8/58 | Beaulieu | 271—88 |

ROBERT B. REEVES, *Primary Examiner.*

EUGENE R. CAPOZIO, RAPHAEL M. LUPO, SAMUEL F. COLEMAN, *Examiners.*